(12) United States Patent
Gammon et al.

(10) Patent No.: US 8,429,535 B2
(45) Date of Patent: Apr. 23, 2013

(54) CLIENT UTILITY INTERACTION ANALYSIS

(75) Inventors: Stacey Gammon, New York, NY (US); Igor Tandetnik, Forest Hill, NY (US); Ilan Caron, New York, NY (US); Ritcha Gupta Ranjan, New York, NY (US); Theodore Power, New York, NY (US)

(73) Assignee: Google Inc., Mountain View, CA (US)

( * ) Notice: Subject to any disclaimer, the term of this patent is extended or adjusted under 35 U.S.C. 154(b) by 588 days.

(21) Appl. No.: 12/570,058

(22) Filed: Sep. 30, 2009

(65) Prior Publication Data

US 2011/0078602 A1 Mar. 31, 2011

(51) Int. Cl.
*G06F 3/048* (2006.01)

(52) U.S. Cl.
USPC ............ 715/737; 715/769; 709/227; 709/224

(58) Field of Classification Search .................. 715/737, 715/769; 709/227, 224
See application file for complete search history.

(56) References Cited

U.S. PATENT DOCUMENTS

| | | | | |
|---|---|---|---|---|
| 7,996,519 | B1 * | 8/2011 | Brown et al. | 709/224 |
| 8,090,679 | B2 * | 1/2012 | Zhuge et al. | 707/603 |
| 2002/0103664 | A1 * | 8/2002 | Olsson et al. | 705/1 |

OTHER PUBLICATIONS

Detert, R. Drag and Drop with Microsoft Internet Explorer 5. Internet Related Technologies (IRT)[online], Feb. 2000 [retrieved on Feb. 9, 2012]. Retrieved from the Internet< URL: http://www.irt.org/articles/js204/>.*

* cited by examiner

*Primary Examiner* — Tadeese Hailu
*Assistant Examiner* — Darrin Hope
(74) *Attorney, Agent, or Firm* — Leason Ellis LLP

(57) ABSTRACT

A client-side user action analysis engine ("analysis engine") identifies user interactions with a client-side utility and provides data representing the interactions to a server side online resource analytics system ("analytics system"). The analysis engine represents user interactions with the client-side utility as network addresses for presentations of online resources to a user in a browser. The analysis engine provides the network addresses to the analytics system and statistics for the user interactions with the client-side utility are computed based on the network addresses. Reporting data specifying the statistics are received from the analytics system for presentation on a display device. The statistics provide information about user interactions with features of the client-side utility.

25 Claims, 5 Drawing Sheets

CLIENT UTILITY INTERACTION ANALYSIS

BACKGROUND

This document relates to information processing.

The Internet enables access to a wide variety of online resources ("resources"). For example, video, audio, webpages directed to particular subject matter, news articles, images, and other resources are accessible over the Internet. Users request presentation of these resources on a user device, for example, by selecting a link to the resource from a user interface of a browser, or entering a uniform resource locator ("URL") for the resource into the browser. In response to the request, the resource is provided to the user device that causes presentation of the resource by the user device.

An online analytics system can track requests of resources by users by logging URLs for each request of a resource. The requests can be logged, for example, by maintaining an index of each resource and data corresponding to each request for the resource. The data corresponding to each request is provided to the analytics system, for example, in response to execution of a snippet of code that is embedded in resource code. For example, the snippet of code can be a snippet of JavaScript™ that initiates a resource tracking routine and provides the corresponding data to the analytics system.

The data corresponding to the request for the resource can include, for example, a session identifier for the request, a network address of the resource for which the tracking is occurring, a referring page from which the request was received, and a time of the request. The data corresponding to the request can also include data identifying a subsequent request of another resource and a time corresponding to the subsequent request.

The online analytics system analyzes the data corresponding to requests for resources and provides reports of the analyzed data, for example, to publishers of the resources. The reports can include, for example, statistics related to the total number of requests for the resource, histograms of requests for the resource relative to a time of the requests, and statistics related to the time between requests for resources and subsequent requests for other resources. Based on the reports, publishers of the resources can identify most often requested resources and their corresponding characteristics to help inform decisions regarding characteristics of resources that may improve performance (i.e., selections) of the publisher's resources. For example, publishers can upgrade or adjust most often used online resources so that more users benefit from the upgrades. However, the online analytics system is generally limited to analyzing resources based requests for the resource over the network to which the online analytics system is connected.

SUMMARY

A client-side user action analysis engine ("analysis engine") identifies user interactions with a client-side utility and provides data representing the interactions to a server-side online resource analytics system. The analysis engine represents the user interactions with the client-side utility as network addresses for online resources presented to a user in a browser.

User interactions with the client-side utility are reported to the server-side online resource analytics system by providing, to the server-side online resource analytics system, the network address specifying the user interaction. Statistics for user interactions with the client-side utility are computed by the server-side online resource analytics system and reporting data is provided by the server-side online resource analytics system for presentation on a display device. The statistics provide information regarding user interactions with features of the client-side utility, such as data identifying the most often used features and features that are used by the most users.

Some aspects of the subject matter described can be implemented in a method performed by a data processing device and including the acts detecting, by at least one processor, a user interaction with a client utility that is implemented in a client device; generating, by at least one processor, an interaction indicator formatted as a network address for a requested network resource, the network address including data specifying the user interaction with the client utility; and providing, to a server-based analytics system, the interaction indicator that represents the user interaction, the server-based analytics system being configured to analyze network resource requests based on network addresses of requested network resources. Other implementations of this aspect include corresponding systems, apparatus, and computer program products.

These and other implementations can optionally include one or more of the following features. The method can further include receiving, from the server-based analytics system, reporting data including statistics that have been computed for the client utility based on interaction indicators. Detecting a user interaction can include detecting instructions generated in response to a user selection of a feature of the client utility. Detecting a user interaction comprises detecting instructions generated in response to a user selection of a feature of the client utility. Generating a uniform resource locator can include identifying a user interaction and a feature of the client utility that are represented by the detected instructions; generating a first part of the uniform resource locator, the first part specifying the user interaction; and generating a second part of the uniform resource locator, the second part specifying the feature that was interacted with. Other aspects of the subject matter described can be implemented in method including the acts.

Particular implementations of the invention can be implemented to realize one or more of the following advantages. User interactions with features of a client utility can be analyzed and reported based on the network addresses that are generated by the analysis engine using an online analytics system. The analysis of the user interactions can be used to prioritize upgrades to features of the client utility. User-interfaces for the client-utility can be designed to make features that are interacted with in sequence more easily accessed by the users based on the analysis of user interactions with the client utility.

The details of one or more implementations are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

A client-side user action analysis engine ("analysis engine") identifies user interactions with a client-side utility and provides data representing the interactions to a server side online resource analytics system. The user action analysis engine represents user interactions with the client-side utility as presentations of online resources to a user in a browser. For example, when a user interacts with the client-side utility by clicking on a particular menu, the user action analysis engine generates a uniform resource locator (URL) address that includes data specifying the user selection of the menu.

User interactions with the client-side utility are reported to the server-side online resource analytics system by providing, to the server-side online resource analytics system, the URL address specifying the user interaction. Statistics for user interactions with the client-side utility are computed by the server-side online resource analytics system. Reporting data is then provided by the server-side online resource analytics system for presentation on a display device. The statistics provide information regarding user interactions with features of the client-side utility, such as data identifying the most often used features and features that are used by the most users. This reporting data can be used, for example, to prioritize upgrades to the features of the client-side utility with which users most often interact. Similarly, the reporting data can include data identifying an order in which features of the client-side utility are interacted with by a user, which can be used to facilitate user-interface flow design decisions.

Figure 1:
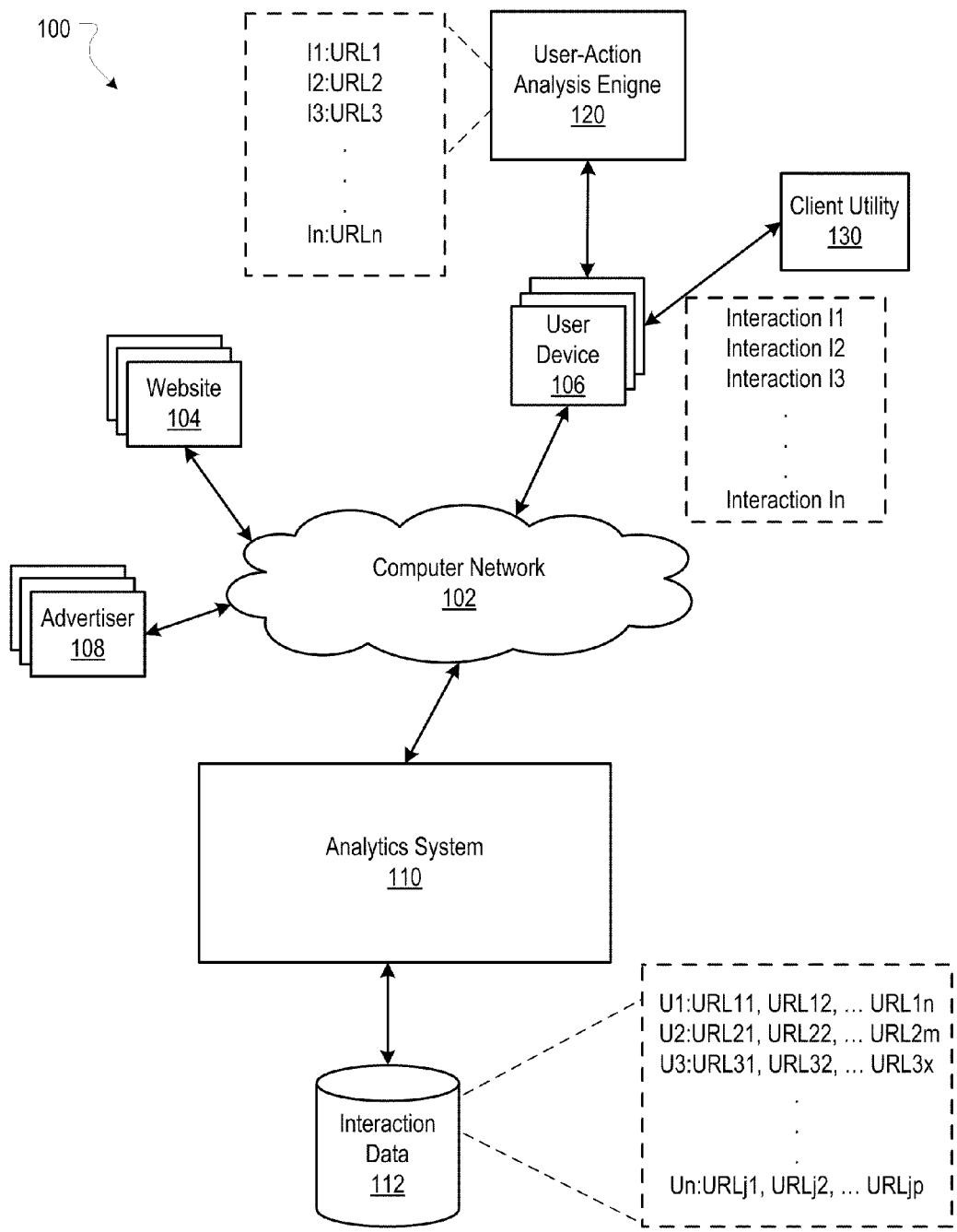
FIG. 1 is a block diagram of an example environment in which an analytics system operates.

FIG. 1 is a block diagram of an example environment 100 in which an analytics system 110 operates. The example environment 100 includes a network 102 such as a local area network (LAN), wide area network (WAN), the Internet, or a combination thereof. The network 102 connects websites 104, user devices 106, advertisers 108, and the analytics system 110. The example environment 100 may include many thousands of websites 104, user devices 106, and advertisers 108.

A website 104 is one or more resources associated with a domain name and hosted by one or more servers. An example website is a collection of webpages formatted in hypertext markup language (HTML) that can contain text, images, multimedia content, and programming elements, e.g., scripts. Each website 104 is maintained by a publisher, e.g., an entity that manages and/or owns the website 104.

A resource is any data that can be provided by the website 104 over the network 102 and that is associated with a resource address. Resources include HTML pages, word processing documents, and portable document format (PDF) documents, images, video, and feed sources, to name only a few. The resources can include content, e.g., words, phrases, images and sounds that may include embedded information (such as meta-information in hyperlinks) and/or embedded instructions (such as JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resource from a website 104. In turn, data representing the resource can be provided to the user device for presentation by the user device 106. The data representing the resource can also include data specifying a portion of the resource or a portion of a user display (e.g., a presentation location of a pop-up window) in which advertisements can be presented. These specified portions of the resource or user display are referred to as advertisement slots.

The analytics system 110 is a system that tracks requests of, and interactions with, websites 104 and/or resources that have been registered with the analytics system 110. For example, a publisher of a website 104 can create an analytics account that enables requests for the publisher's resources to be tracked. In turn, the publisher is provided a portion of code (e.g., JavaScript™) that the publisher includes in the code that defines the resource so that data identifying a request for the resource is provided to the analytics system 110 in response to a request for the resource by a user device 106.

The data identifying the request can include, for example, data specifying a URL of the requested resource, a receipt time for the request, and a URL of a referring page that was presented by the user device when the request was received. Additionally, the data can include a URL of another resource that was requested in response to presentation of the resource as well as a receipt time corresponding to the request for the other resource.

Based on the data provided, the analytics system 110 computes statistics that characterize the requests for the resource. For example, the analytics system 110 can compute a total number of requests for the resource, statistics characterizing amounts of time between requests for resources (i.e., dwell times), as well as identifying ordered series of resources that were requested by users. The analytics system 110 generates a report including the computed statistics and provides the report upon request by the publisher of the resource.

In some implementations, the analytics system 110 can be used to analyze user interactions with a client utility when the user interactions are formatted as network addresses for network resources. For example, as described below, user interactions can be tracked, formatted as network addresses for network resources, and provided over the network 102 for analysis by the analytics system.

The environment 100 includes a user-action analysis engine 120 ("analysis engine"). The analysis engine can be implemented as part of a client side utility or independent of the client side utility. The analysis engine 120 identifies and tracks user interactions (I1, I2, I3, . . . In) with a client utility 130 that is implemented in the user device 106. The client utility 130 can be a client-side program that operates on the user device 106. For example, an advertising campaign management utility can be installed on a client device to facilitate management of an advertising account by interacting with features (e.g., buttons, tabs, menus, and data) of the utility. In turn, instructions are generated based on the interactions and cause attributes of the advertising account to be adjusted.

The analysis engine 120 detects the generated instructions and logs data identifying interactions corresponding to the instructions. In some implementations, the analysis engine 120 generates interaction indicators representing the user interactions. The interaction indicators are formatted, for example, as a network addresses (URL1 . . . URLn) that specify the user interactions (I1 . . . In) with features of the client utility 130. Generation of interaction indicators is described in more detail with reference to FIG. 2B.

In some implementations, the analysis engine 120 is implemented so that every interaction (i.e., selection of a feature) with the client utility is detected and/or logged. Alternatively, the interactions that are tracked and/or logged by the analysis engine 120 can be limited to a selected group of features of the client utility 130. For example, only interactions with specified user interfaces may be tracked and/or logged, if desired. Interaction tracking is described in more detail with reference to FIG. 2A.

The analysis engine 120 can be implemented so that interactions are only tracked in response to the user of the client utility 130 assenting to interaction tracking. For example, the analysis engine 120 can present, to the user, an opt-in/opt-out interface with which the user can either agree to interaction tracking or decline that the analysis engine 120 perform analysis tracking. When the user opts-in, the analysis engine 120 can initiate interaction tracking and generation of interaction indicators.

The analysis engine 120 provides the interaction indicators (URL1 . . . URLn) to the analytics system 110 over the network 102. For example, the analysis engine 120 can initiate an HTTP session with the analytics system 110 when the client utility 130 is launched on the user device 106 and provide the analysis system 110 with interaction indicators representing user interactions with the client utility 130 over the HTTP session, as described in more detail with reference to FIGS. 2B and 4.

In some implementations, user interaction with the client utility 130 for which interaction indicators (e.g., URL11, URL12, . . . URL1n) are provided to the analytics system 110 during the same HTTP session can define an interaction session (e.g., U1). For example, the analytics system 110 can store each interaction indicator (e.g., URL1 . . . URLn) that is received during the same HTTP session in an interaction data store 112 and index each interaction indicator based on its corresponding interaction session.

In some implementations, interaction data that is provided to the analytics system 110 can have a corresponding time stamp representing a time at which the user interaction represented by the network address occurred. The time stamp can be a relative measure of time, for example, an amount of time since the HTTP session was initiated, or an absolute time, such as the Greenwich Mean Time of an interaction. The time stamp can be generated by the analysis engine 120 and provided to the analytics system 110 or generated by the analytics system 110 upon receipt of the network address. Timestamps can facilitate computation of time based statistics for user interactions as well as filtering reporting data for interactions based on time, as described below with reference to FIG. 3.

Representing interactions with a client utility as a network address enables analysis of the user interactions by the online analytics system 110 in a manner similar to that for analyzing page views for online resources. For example, the online analytics system 110 can compute statistics for each of the unique network address corresponding to the features of the client utility because the analytics system 110 recognizes the network addresses as page views for online resources at the specified network address. The analytics system 110 can also compute interaction session based statistics based on network addresses that are received for the same HTTP session.

The analytics system 110 generates reports for the features of the client utility 130 based on the statistics that are generated. For example, the analytics system 110 can generate a report providing statistics for a total number of users that interact with a feature and an average number of interactions with a particular feature during interaction sessions, among other statistics for user interactions with features of the client utility 130. Statistics reporting is described in more detail with reference to FIGS. 3 and 4.

Figure 2A:
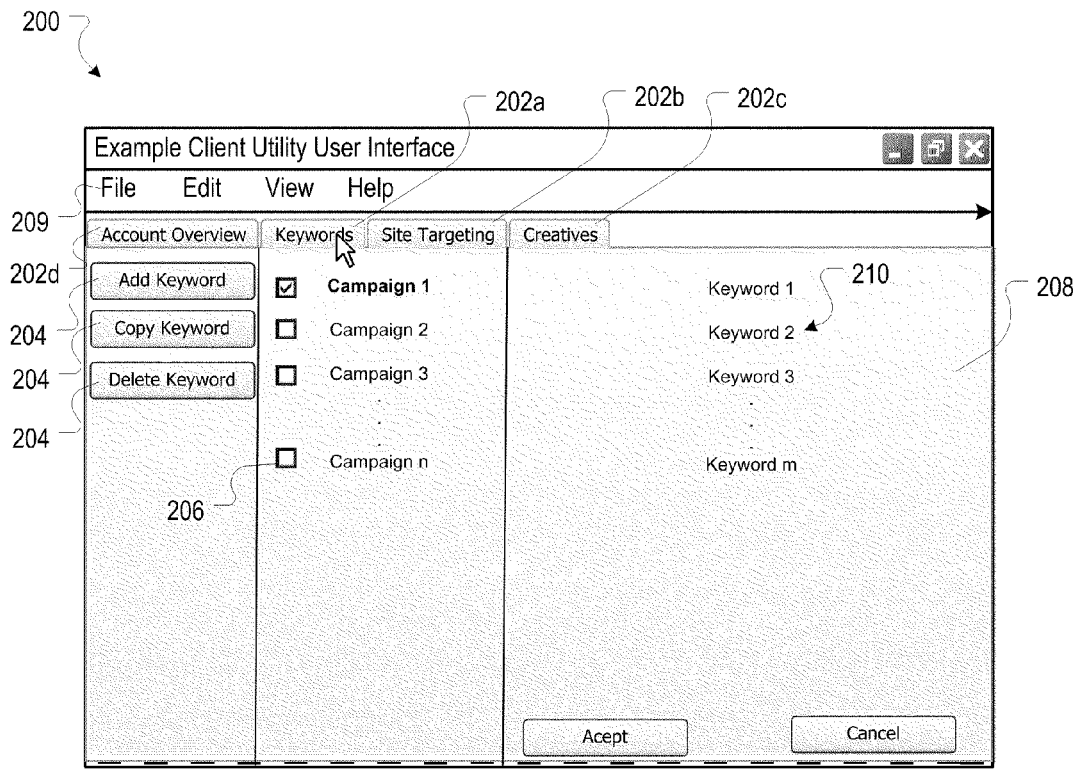
FIG. 2A is an illustration of an example user interface 200 of a client-side client utility for which interaction indicators are generated.

FIG. 2A is an illustration of an example user interface 200 of a client-side client utility for which interaction indicators are generated. In this example, the client utility is an advertising account management utility with which an advertiser can adjust and manage its advertising account. The example user interface 200 includes selectable tabs 202, buttons 204, check boxes 206, and menus 209 that are selected by a user to specify data for presentation in a data presentation area 208 or otherwise control functions of the utility. In response to user selections of tabs 202, buttons 204 and/or check boxes 206, or menus 209, corresponding data 210 is presented in the data presentation area 208.

For example, a user can select (i.e., click on) on the "keywords" tab 202a to cause presentation of a "keywords" user interface that allows the user to make changes to the keywords that are specified for the advertisement account. The user can then select the "campaign 1" check box to request presentation of keywords for campaign 1. In response to the selection of the "campaign 1" check box, instructions are generated that cause the keywords (i.e., keyword 1-keyboard m) for campaign 1 to be presented in the data presentation area 208. The advertiser can then select a button 204, another check box 206 or a keyword from the data presentation area 208 to change keywords for campaign 1 or request presentation of other data.

The user can also interact with the example user interface 200, for example, to associate a keyword (e.g., keyword 1) with another campaign by a "drag and drop" process. For example, the user can select a keyword, for example, by selecting the keyword and dragging the keyword over the title text for the other campaign. When the user de-selects the keyword, for example, by releasing a mouse button, while the keyword is over the title of the other campaign, a script is executed that causes the keyword to be associated with the other campaign.

Figure 2B:
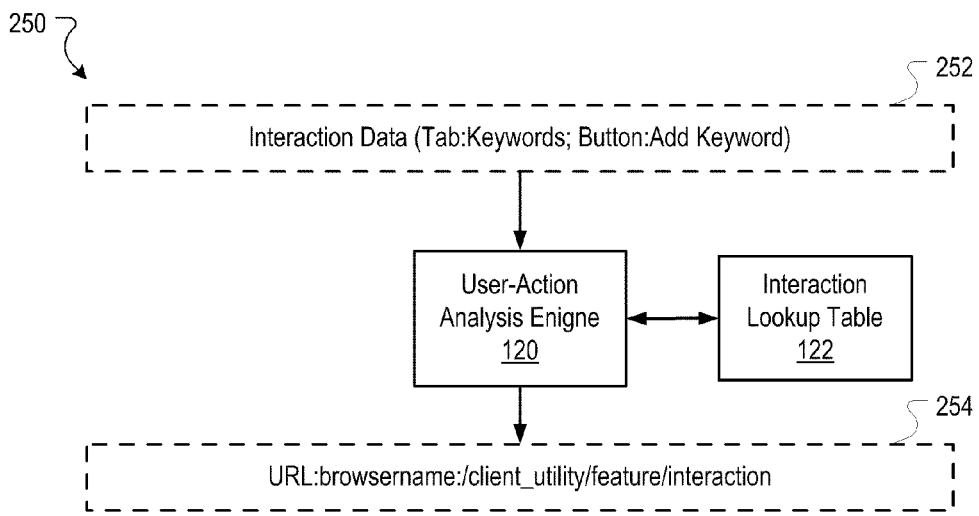
FIG. 2B is an example process flow for generating an interaction indicator that represents an interaction with a client utility.

In response to interactions with the client utility, the analysis engine 120 generates interaction indicators representing the interactions. FIG. 2B is an example process flow 250 for generating an interaction indicator that represents an interaction with a client utility. Each interaction with the client utility results in interaction data 252, such as an execution command, script, or other interaction data being generated. The interaction data 252 causes the client utility to perform an action corresponding to the user interaction. For example, the interaction data can include data specifying a selection of a feature of the client utility or data indicating a "drag and drop" of data from one location to another location.

The analysis engine 120 detects the interaction data 252 that is generated in response to a user interaction and generates a network address 254 corresponding to the user interaction. For example, the analysis engine 120 can detect a selection (i.e., a click) of a feature of the user interface such as a button, check box, or a tab based on instructions that are generated in response to the selection of the feature and generate a network address that specifies the corresponding selection. The analysis engine 120 can also detect a selection of a drag and drop process by detecting, for example, a "dragenter" event that is generated in response to the de-selection of the data being dragged and dropped.

In some implementations, each component, or portion, of the network address 254 can specify a characteristic of the interaction and the environment in which the interaction occurred. In these implementations, the network addresses for selections of features are generated based on an event identifier (e.g., add keywords command) for the interaction and a document title (e.g., tab title) corresponding to the feature with which a user interacted.

For example, in response to detecting a user selection of the "add keywords" button 202 in the "keywords" tab of FIG. 2A, the analysis engine 120 can generate the following network address: /browsername://client_utility/keyword_tab/select_add_keywords. In this example network address, "browsername" can be set to a value representing a default internet browser and "client_utility" can be set to a value representing the client utility.

Some user interactions with the client utility result in multiple instructions being generated. For example, there are multiple instructions generated to perform a "drag and drop" operation. In particular, "dragexit" data is generated when data is selected and "dragged" (i.e., positioned) out of its original presentation location. Additionally, "dragover" data is generated when the selected data is positioned over a potential destination and "dragenter" data is generated when the selected data is de-selected indicating a request to move the data to a destination.

An interaction indicator can be generated for each individual interaction specified by the instructions, as described above. However, in some implementations, a set of instructions representing a multi-step user interaction can be identified as single interactions. In these implementations, the analysis engine 120 can log the interaction data for the user interactions, but generate the network address in response to the command being completed and generate a single network address representing the set of user interactions.

In some implementations, multi-step interactions are represented in a different network address format than single step interactions. For example, when a user interaction corresponds to a "drag and drop" command, the analysis engine 120 can log data associated with the selection of the data, dragging of the data over potential destinations for the data, and de-selection (i.e., dropping) of the data at a position representing the destination for the data. In response to detecting the de-selection of the data (i.e., a "dragenter" event), the analysis engine 120 can generate a network address that specifies that data was "dragged and dropped" and also specifies an original location of the "dragged and dropped" data as well as a destination of the "dragged and dropped" data.

An example, URL for a "drag and drop" user interaction can be formatted as /browsername://client_utility/original_location/DRAGGEDTO:destination_location/datatitle, where "original_location" and "destination_location" can reference locations of the client utility with which the data is associated (e.g., campaign names) and "datatitle" can be a value representing the data (e.g., text identifying a keyword).

Once the network address has been generated for a user interaction, the analysis engine 120 provides the network addresses representing user interactions with the client utility to the analytics system 110 over the network 102. In some implementations, the network addresses representing user interactions can be provided to the analytics system 110 as a remote image request. The remote image request is an asynchronous process such that the client utility does not experience latencies from providing data to the analytics system 110 because the client utility does not wait for a connection to the analytics system 110 or any data from the analytics system 110.

As described above, the analysis engine 120 can initiate an HTTP session with the analytics system 110 over which the network addresses can be provided. The HTTP session can be initiated, for example, when the client utility is launched by a user device and the user device is connected to the network 102. When the client utility user is launched without the user device being connected to the network 102, the HTTP session can be initiated once the user device is connected to the network 102.

In some implementations, user interactions can be logged by the analysis engine 120 and provided to the analytics system 110 whenever an HTTP session is initiated with the analytics system 110. For example, if the user device is not connected to the network 102, the analysis engine 120 can log interaction data in a data store and upon initiation of an HTTP session with the analytics system 110, provide the logged interaction data. In other implementations, only user interactions that occur during an HTTP session are reported to the analytics system 110.

Once the interaction indicators have been provided to the analytics system 110, the analytics system 110 can compute statistics based on the interaction indicators and provide reporting data for the statistics. For example, the analytics system 110 can compute numbers of users that interacted with each feature of the client utility and series of features that users interacted with prior to, or subsequent to, interacting with a specified feature. The reporting data includes instructions that when executed cause a report interface to be presented on a display of a processing device.

Figure 3:
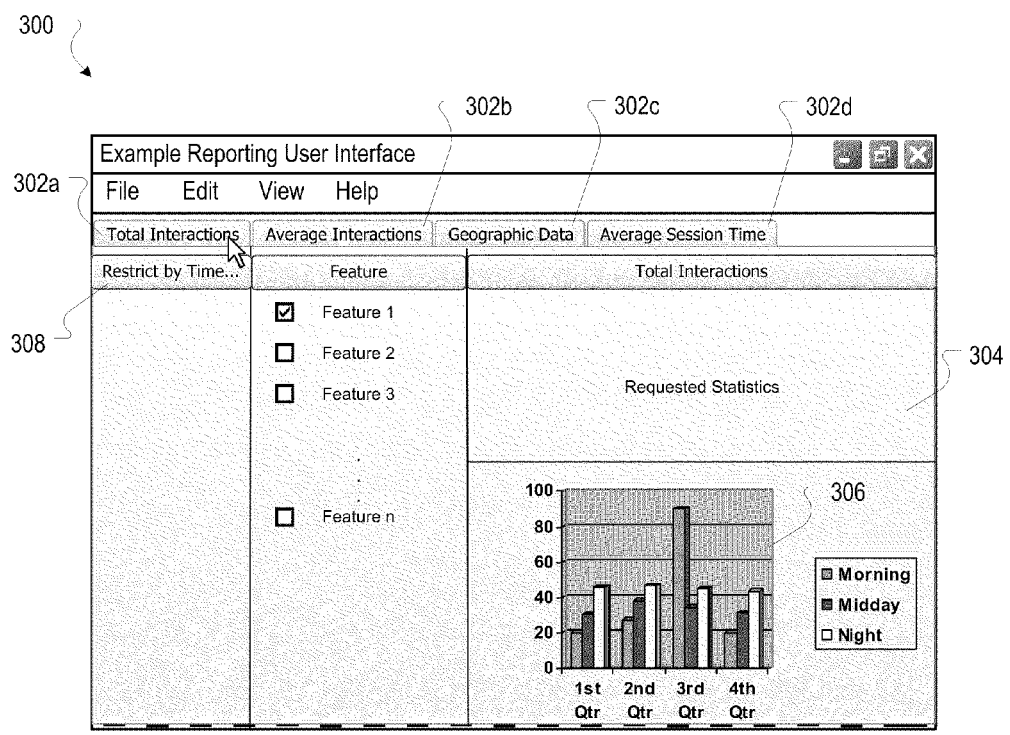
FIG. 3 is an example report interface that can be presented on a display device.

FIG. 3 is an example report interface 300 that can be presented on a display device. The report interface 300 enables a user to request presentation of, and view, various statistics for user interactions with the client utility. For example, statistics related to user interactions with the various features of the client utility, interactions within an interaction session and geographic information associated with the users sessions can each be presented in the report interface 300.

In some implementations, the statistics are presented in a statistics presentation area 302 of a report page 304 that is presented in the report interface 300. The statistics that are presented in the statistics presentation area 302 can be selected, for example, by selecting a tab 302a-302d corresponding to the statistics that the user wants presented. For example, in response to a user selection of a "total interactions" tab 302a, a value specifying a total number of interactions with various features of the client utility is presented in the statistics presentation area 304.

The values presented for the features in the "total interactions" tab 302a can be computed, for example, by computing a total number of network addresses corresponding to interactions with the features and assigning the total number as the value. The features and corresponding values can be ordered for presentation in descending (or ascending) order of the total number of interactions with the feature, in alphabetical order of features, or based on other characteristics of the features.

In some implementations, a graphical display 306 of the statistics can also be provided in the report interface 300. For example, the graphical display can include a graph that plots a total number of interactions for selected features.

The statistics that are presented in the report interface 300 can be restricted to statistics for interactions with the client utility that occurred during a specified range of time. For example, a user of the report interface can select a "restrict by time" button 308 to specify a time restrictions. In response to selection of the "restrict by time" button 308, a time selection interface can be provided to the user. The user can interact with the time selection interface to select or input data to specify relevant dates and/or times of day ("relevant time period") for which the user would like statistics presented.

The analytics system 110 uses the data specifying the relevant time period to select interaction indicators for which statistics are to be computed. For example, the analytics system 110 can compare the timestamps for the interaction indicators to the relevant time period to determine whether the interactions corresponding to the interaction indicators occurred during the relevant time period. In turn, the analytics system 110 computes statistics for the interactions that are identified as occurring during the relevant time period.

Additional tabs can be provided for presenting an average number of interactions with the client utility over a single interaction session, a histogram that provides a distribution of users based on a number of interactions reported for a single interaction session, a total number of unique user interactions during an interaction session, a total number of users of the client utility over a specified time period, a total number of users of the client utility, and a histogram that provides a distribution of users relative to a length of the interaction session. The values presented for the features in each of these tabs can be computed, for example, based on the number of interaction indicators corresponding to the specified client utility feature that were received from the analysis engine 120 and timestamps for each of the interaction indicators.

Tabs can also be provided for presenting statistics or histograms of geographic locations of client devices using the client utility 130 based on geographic location from which interaction indicators have been provided, languages in which the users interact with the client utility, operating systems for the user devices with which the users interact with the client utility 130 and screen resolutions of the display devices that the users are using. Information for computing this data can be identified, for example, from the HTTP sessions that are initiated between the analysis engine 120 and the analytics system 110. For example, the geographic location of the user device can be derived from Internet Protocol addresses or language indicators that are specified for the interaction session. Additionally, the resolution of the display device being used can be reported based on settings of the client utility 130. In turn, the analytics system 110 can compute statistics for each of these user characteristics and provide the results in report pages in the reporting interface 300.

Figure 4:
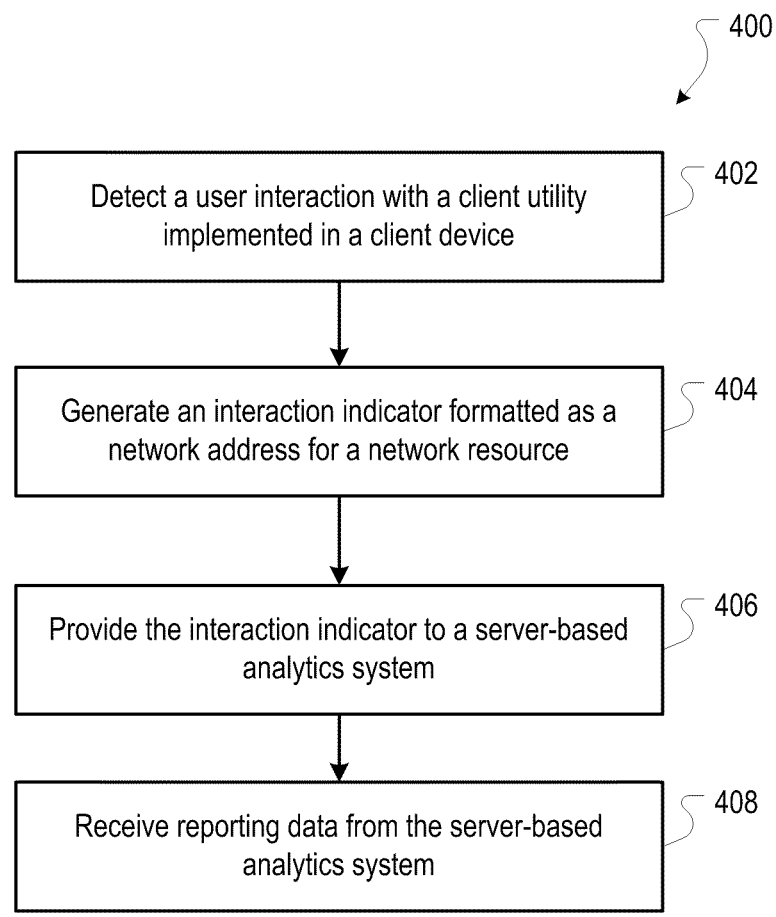
FIG. 4 is a flow chart of an example process for tracking user interactions with a client utility.

FIG. 4 is a flow chart of an example process 400 for tracking user interactions with a client utility. The process 400 is a process by which user interactions with a client utility are detected, interaction data representing the user interactions are generated and the interaction data is provided to a server-based analytics system. The analytics system computes statistics relative to the use of the client utility based on the interaction data. In turn, reporting data including the computed statistics is received from the server-based analytics system. The process 400 can be implemented, for example, by the analysis engine 120 of FIG. 1.

A user interaction with a client utility is detected (402). The user interaction can be, for example, a single selection of a feature of the client utility, such as a button, menu, tab or other feature of the client utility. The user interaction can also be defined by a series of interactions with the client utility. For example, a user can perform a drag and drop operation by selecting a graphical reference to data that is presented on a display device, moving the graphical reference over a graphical reference representing a destination location for the data and de-selecting the data to associate the data with the destination location. The detection can be performed, for example, by the analysis engine of FIG. 1.

In some implementations, the analysis engine is implemented as instructions that upon execution detect user interactions and generate interaction indicators representing the user interactions. For example, when the client utility is implemented using a software platform that can execute JavaScript, html, xml, and xul instructions, then the analysis engine can be implemented in the client utility including instructions that cause execution of a JavaScript file. In response to executing the JavaScript file, the analysis engine detects instructions representing user interactions, generates the interaction indicators corresponding to detected user interactions and provides the interaction indicators to the analysis system.

The JavaScript file can be dynamically requested from a network location using an xmlHTTPrequest object in response to execution of the analysis engine. The xmlHTTPrequest object initiates an asynchronous download of the JavaScript. Using an asynchronous download process enables the client utility to continue to execute even if the download of the JavaScript fails or is delayed for longer than a timeout period for the client utility. The JavaScript can be downloaded, for example, when each new xul page is presented by the client device to track user interactions with each user interface display that is presented.

In some implementations, a try-catch operation is included in the JavaScript for the executed in response to a request to execute instructions for the analysis engine 120. Executing a try-catch operation for each request for the analysis engine reduces the likelihood that execution of the analysis engine will negatively affect operation of the client utility. For example, if there is an error executing the analysis engine, the try-catch operation will catch and suppress the error such that the process 400 can continue despite the error.

User interactions with the client utility generate instructions that cause the client utility to perform operations in response to the user interactions. For example, interaction data indicating that a user selected an "add keyword" button will generate instructions indicating the selection of the "add keyword" button that cause presentation of a user interface for adding a keyword to an advertising account.

These instructions can be used to identify the feature of the client utility with which the user interacted and the action that was taken with respect to the feature. For example, the detected instructions can be cross-referenced with an index of instructions. In turn, the user interaction and the feature of the client utility that are represented by the detected instructions can be identified, for example, by identifying a user interaction and a feature by which the detected instruction is indexed.

Once the user interaction has been detected, an interaction indicator is generated for the network resource (404). In some implementations, the interaction indicator is formatted as a network address for a network resource. For example, the interaction indicator can be a URL that corresponds to the user interaction with the client utility.

Different portions of the URL can specify different aspect of the user interaction with the client utility. For example, one portion of the URL can be generated to specify a feature of the client utility with which the user interacted, such as a menu, tab, and button in the client utility. Another portion of the URL can be generated to specify the action that was taken with respect to the feature. For example, the other portion of the URL can specify that the user selected (i.e., clicked on) the feature or dragged and dropped data from one location to another location. Example formats for the URL are described in more detail, with reference to FIG. 2B.

The interaction indicator is provided to a server-based analytics system (406). In some implementations, the server-based analytics system includes instructions that cause the system to analyze network resource requests based on network addresses of requested network resources. For example, the server-based analytics system can receive URL's for network resources that have been requested and compute statistics for requests of the resources. Because the interaction indicator is formatted as a network address of a network resource, the analytics system can analyze user interactions with the client utility based on the network addresses that are received for interactions with the client utility.

In some implementations, the interaction indicator is provided to the analytics system over an HTTP session that is initiated between the user device on which the client utility is operating and a server for the analytics system. For example, when the client utility is launched, instructions included in the client utility can initiate an HTTP session between the user device and a server for the analytics system. In turn, interaction data that is generated during the HTTP session can be provided to the analytics system over the HTTP session. As described above, the interaction data can be provided during the HTTP session as a remote image request, and each HTTP session can have a unique session identifier that is associated with the interaction data that is generated and provided during the same HTTP session to facilitate computation statistics for sessions, as described above.

Reporting data is received from the server-based analytics system (408). In some implementations, the reporting data includes statistics that have been computed for the client utility based on the interaction data. For example, the reporting data can include data specifying a total number of interactions with the client utility and/or with specified features of the client utility. Additionally, the reporting data can specify an average number of total interactions with the client utility during individual HTTP sessions or over a specified time period. The reporting data can also specify other statistics and interaction data for the client utility and provide histograms and other graphical representations of the statistics, as described in more detail with reference to FIG. 3.

Figure 5:
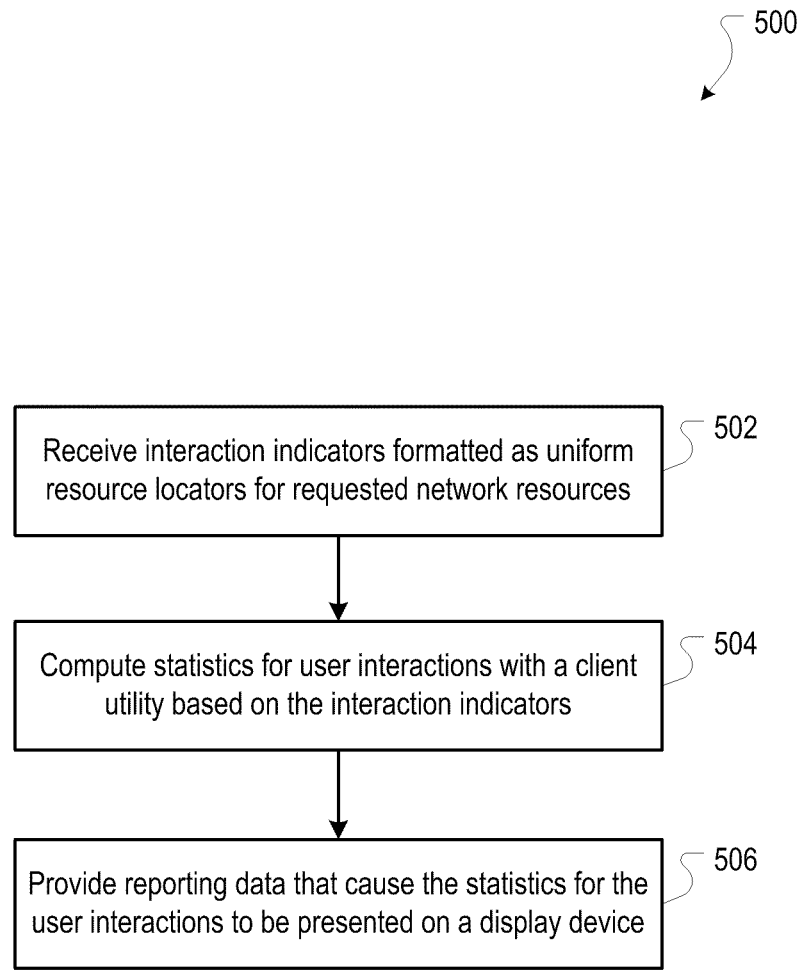
FIG. 5 is an example process for analyzing user interactions with a client utility.

FIG. 5 is an example process 500 for analyzing user interactions with a client utility. The process 500 is a process by which interaction indicators that specify user interactions with a client utility are received from a client utility analysis engine. Statistics are computed for user interactions with the client utility based on the interaction indicators, and reporting data reporting the statistics is provided for presentation on a display device. The process 500 can be implemented, for example, by the analytics system 110 of FIG. 1.

Interaction indicators, formatted as uniform resource locators for requested network resource, are received from a user-action analysis engine (502). The interaction indicators include data specifying user interactions with a client utility and features of the client utility with which the interaction occurred. In some implementations, the uniform resource locator for the interaction indicator has a first portion that specifies the user interaction with the client utility and a second portion that specifies the feature of the client utility with which the interaction occurred, as described above with reference to FIG. 2B.

Statistics are computed for user interactions with a client utility based on the interaction indicators (504). In some implementations, the computed statistics include statistics specifying a total number of users that interacted with the features of the client utility, average numbers of users that interacted with the features over specified time periods, as well as distributions of users that interacted with various features of the client utility, as described with reference to FIG. 3.

Reporting data that includes instructions, that when executed, cause the statistics for the user interactions to be presented on a display device (506). The reporting data can include the computed statistics for features of the client utility and provide a report interface with which a user can request specific statistics for presentation, as described with reference to FIG. 3.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   detecting, by at least one processor, a plurality of user interactions with a client utility that is implemented in a client device;
   generating, by at least one processor, a uniform resource locator (URL) that corresponds to the plurality of user interactions with the client utility and that identifies the plurality of user interactions as a single user interaction, the URL comprising a URL having a plurality of URL components, each URL component corresponding to at least one of the plurality of user interactions, wherein the URL has (a) at least one URL component specifying a feature of the client utility with respect to which a user interaction occurred, and (b) at least one URL component specifying an action taken with respect to the feature; and providing the URL to a server-based analytics system, the server-based analytics system being configured to analyze one or more URLs as page views for online resources at a specified network address, and thereby analyze one or more user interactions with the client utility based on their respective URLs.

2. The method of claim 1, further comprising receiving, from the server-based analytics system, reporting data including statistics that have been computed for the client utility based on URLs.

3. The method of claim 1, wherein detecting a plurality of user interactions comprises detecting a drag and drop operation.

4. The method of claim 3, wherein detecting a drag and drop operation comprises:
detecting instructions representing a dragenter command that indicates a destination location for dragged and dropped data.

5. The method of claim 4, wherein generating a URL comprises generating a URL comprising (a) a URL component specifying detection of the drag and drop operation, (b) a URL component specifying an original location for the dragged and dropped data, and (c) a URL component specifying a destination location for the dragged and dropped data, the original location being based on a dragexit command indicating a selection and movement of data from its original location.

6. The method of claim 1, wherein detecting a plurality of user interactions comprises detecting instructions generated in response to a user selection of a feature of the client utility.

7. The method of claim 6, wherein generating a URL comprises generating a URL having (c) at least one URL component specifying a characteristic of a user interaction with the client utility and (d) at least one URL component specifying an environment in which the interaction occurred.

8. The method of claim 7, wherein generating a URL comprises:
identifying a user interaction and a feature of the client utility that are represented by the detected instructions;
generating a first part of the URL, the first part specifying the user interaction; and
generating a second part of the URL, the second part specifying the feature that was interacted with.

9. The method of claim 1, wherein providing the URL comprises:
establishing a network session with a server that receives data for the server-based analytics system; and
transmitting, over the network session, data including the URL.

10. The method of claim 9, wherein transmitting data comprises transmitting data over a remote image request.

11. The method of claim 1, wherein providing the URL comprises asynchronously providing the URL.

12. The method of claim 1, further comprising receiving user assent for reporting user interactions to the server-based analytics system.

13. A system, comprising:
a client device upon which a client utility operates; and
a user-interaction analysis engine in data communication with the client device upon which the client utility operates, the user-interaction analysis engine including at least one processor operable to detect a plurality of user interactions with the client utility, generate a uniform resource locator (URL) that corresponds to the plurality of user interactions with the client utility and that identifies the plurality of user interactions as a single user interaction, the URL comprising a URL having a plurality of URL components, each URL component corresponding to at least one of the plurality of user interactions, wherein the URL has (a) at least one URL component specifying a feature of the client utility with respect to which a user interaction occurred, and (b) at least one URL component specifying an action taken with respect to the feature, and provide the URL to a server-based analytics system, the analytics system being operable to analyze one or more URLs as page views for online resources at a specified network address, and thereby analyze one or more user interactions with the client utility based on their respective URLs and provide reporting data resulting from the analysis.

14. The system of claim 13, wherein the analysis engine is further operable to detect the plurality of user interactions based on instructions generated by the client utility in response to a user interaction with the client utility.

15. The system of claim 13, wherein the analysis engine is further operable to detect a drag and drop operation based on instructions defining the drag and drop operation.

16. The system of claim 15, wherein the analysis engine is further operable to detect the drag and drop operation based on instructions defining a dragenter command that indicates a destination location for dragged and dropped data.

17. The system of claim 16, wherein the analysis engine is further operable to generate a URL comprising (a) a URL component specifying detection of the drag and drop operation, (b) a URL component specifying an original location for the dragged and dropped data, and (c) a URL component specifying a destination location for the dragged and dropped data, the original location being based on a dragexit command indicating a selection and movement of data from its original location.

18. The system of claim 13, wherein the URL comprises (c) at least one URL component specifying a characteristic of a user interaction with the client utility and (d) at least one URL component specifying an environment in which the interaction occurred.

19. The system of claim 13, wherein the analysis engine is further operable to establish a network session with a server that receives data for the analytics system and transmit the URL to the analytics system over the network session.

20. A computer-implemented method, comprising:
receiving, by at least one processor uniform resource locators (URLs) from a user-action analysis engine, each of the URLs corresponding to a plurality of user interactions with a client utility and identifying the plurality of user interactions as a single user interaction, each of the URLs comprising one or more URL components and having (a) at least one URL component specifying one or more features of the client utility with respect to which an interaction occurred and (b) at least one URL component specifying an action taken with respect to the one or more features;
computing, by at least one processor, statistics for user interactions with the client utility based on an analysis of each of the URLs as page views for online resources at a specified network address; and
providing, to a processing device, reporting data including instructions, that when executed, cause the statistics for the user interactions to be presented on a display device.

21. The method of claim 20, wherein receiving URLs comprises receiving URLs having (c) at least one URL component specifying a characteristic of a user interaction with the client utility and (d) at least one URL component specifying an environment in which the interaction occurred.

22. The method of claim 20, wherein computing statistics comprises computing a total number of interactions with the client utility and an average number of interactions with the client utility.

23. The method of claim 22, wherein computing statistics comprises computing the statistics for interactions with each feature of the client utility.

24. A non-transitory computer readable storage medium encoded with a computer program comprising instructions that when executed operate to cause a computer to perform operations:

detecting a plurality of user interactions with a client utility that is implemented in a client device, each of the interactions including a manipulation of a feature of the client utility;

generating a uniform resource locator (URL) that corresponds to the plurality of user interactions with the client utility and that identifies the plurality of user interactions as a single user interaction, the URL comprising a URL having a plurality of URL components, each URL component corresponding to at least one of the plurality of user interactions, wherein the URL has (a) at least one URL component specifying a feature of the client utility with respect to which a user interaction occurred, and (b) at least one URL component specifying an action taken with respect to the feature;

providing the URL to a server-based analytics system, the server-based analytics system being configured to analyze one or more URLs as page views for online resources at a specified network address, and thereby analyze one or more user interactions with the client utility based on their respective URLs; and receiving, from the server-based analytics system, reporting data including statistics that have been computed for the client utility based on URLs.

25. The non-transitory computer readable storage medium of claim 24, wherein generating an URL comprises generating a URL having (c) at least one URL component that specifies a characteristic of a user interaction with the client utility and (d) at least one URL component that specifies an environment in which the interaction occurred.

\* \* \* \* \*